(12) United States Patent
Audleman et al.

(10) Patent No.: US 6,806,890 B2
(45) Date of Patent: *Oct. 19, 2004

(54) GENERATING A GRAPHICAL USER INTERFACE FROM A COMMAND SYNTAX FOR MANAGING MULTIPLE COMPUTER SYSTEMS AS ONE COMPUTER SYSTEM

(75) Inventors: Kevin Forbes Audleman, Seattle, WA (US); Kevin Michael McBride, Menlo Park, CA (US); Betty Joan Patterson, Hollister, CA (US); Kelly Ann Spain, Wichita, KS (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/375,602

(22) Filed: Aug. 17, 1999

(65) Prior Publication Data

US 2002/0196281 A1 Dec. 26, 2002

(51) Int. Cl.[7] ................................. G09G 5/00
(52) U.S. Cl. .................. 345/762; 345/760; 345/764; 345/798; 345/708
(58) Field of Search ................ 345/760, 762, 345/966, 764, 749, 839, 716; 707/513, 102; 717/11, 1; 715/513; 709/220

(56) References Cited

U.S. PATENT DOCUMENTS

| | | | |
|---|---|---|---|
| 5,734,597 A | | 3/1998 | Molnar et al. |
| 5,774,670 A | | 6/1998 | Montulli |
| 5,826,242 A | | 10/1998 | Montulli |
| 5,918,237 A | * | 6/1999 | Montalbano ............ 707/513 |
| 5,956,024 A | * | 9/1999 | Strickland et al. ...... 345/716 |
| 5,970,472 A | * | 10/1999 | Allsop et al. ............ 705/26 |
| 5,999,179 A | * | 12/1999 | Kekic et al. ............ 345/839 |
| 6,075,528 A | * | 6/2000 | Curtis .................... 345/333 |
| 6,167,448 A | * | 12/2000 | Hemphill et al. ....... 709/224 |
| 6,188,401 B1 | * | 2/2001 | Peyer .................... 345/744 |
| 6,230,173 B1 | * | 5/2001 | Ferrel et al. ........... 707/513 |
| 6,342,907 B1 | * | 1/2002 | Petty et al. ............. 345/762 |
| 6,366,934 B1 | * | 4/2002 | Cheng et al. ........... 707/513 |
| 6,466,971 B1 | * | 10/2002 | Humpleman et al. .... 709/220 |
| 6,601,071 B1 | * | 7/2003 | Bowker et al. ......... 707/102 |

FOREIGN PATENT DOCUMENTS

| | | |
|---|---|---|
| EP | 0 851 368 A2 | 7/1998 |
| WO | WO 98/47068 | 10/1998 |

OTHER PUBLICATIONS

IBM Technical Disclosure Bulletin, vol. 40, No. 8, "Method to Convert Graphical User Interface Definitions and Windows to HyperText Markup Language", Aug. 1997, pp 167–173.

IBM Technical Disclosre Bulletin, vol. 40, No. 11, "Writing Local Data From an Hyper Text Language Page", Nov. 1997, pp. 139.

(List continued on next page.)

*Primary Examiner*—Kristine Kincaid
*Assistant Examiner*—Mylinh T Tran
(74) *Attorney, Agent, or Firm*—Gates & Cooper LLP

(57) ABSTRACT

A graphical user interface can be automatically generated from a command syntax for managing multiple computer systems as one computer system. The command syntax is represented using an eXtensible Markup Language (XML) document file, an XML schema file, and a text description file. The XML document file, XML schema file, and text description file are maintained on a server and downloaded to a client as required. A user interface program uses the XML document, XML schema, and text descriptions to generate a "Wizard" that comprises the graphical user interface, wherein the Wizard provides a series of step-by-step dialogs for assisting the operator in creating a command from the command syntax.

39 Claims, 10 Drawing Sheets

OTHER PUBLICATIONS

Lon Mu Liu, et al., "A System–independent Graphical User Interface for Statistical Software", Computational Statistics & Data Analysis, vol. 19, No. 1, pp 23–44, Jan. 1995 (Abstract 1pp).

Kolman, J., "The Design of a Graphical Internet Search Tool", Online Information 94. 18th International Online Infomration Meeting. Proceedings, London, UK, Dec. 6–8, 1994. (Abstract 1pp).

Japanese Patent No. JP 10–187512, Nakahiro Tsurusaki et al, "Method for Generating Program for Database Structuring and Database Operation", Jul. 21, 1998 (Abstract 1pp).

Japanese Patent No. JP 10–260961 A, "Method and Device for HTML file for WWW", Toshiba Corp., Sep. 29, 1998 (Abstract 1pp).

* cited by examiner

GENERATING A GRAPHICAL USER INTERFACE FROM A COMMAND SYNTAX FOR MANAGING MULTIPLE COMPUTER SYSTEMS AS ONE COMPUTER SYSTEM

BACKGROUND OF THE INVENTION

1. Field of the Invention

The present invention generally relates to the management of computer-implemented systems, and in particular, to a system and method for generating a graphical user interface from a command syntax for managing multiple computer systems as one computer system.

2. Description of Related Art

The management of computer systems has become increasingly more complex. This results from the complex hardware and software environments found in modern-day computer systems. For example, it is not uncommon to manage a large number of computer systems in a network, wherein the systems perform different tasks and run differing versions of software, wherein the systems are geographically dispersed, and wherein multiple operations consoles are required. Yet, it is not desirable to have a separate operations console for each computer system, nor is desirable to maintain a different client interface for each of the operations consoles.

As computer systems and networks grow in complexity, so to do the operations consoles and their user interfaces. It can be seen, then, that there is a need in the art for a system that can manage multiple computers and that has a client interface that is easy to maintain. Moreover, there is a need in the art for client interfaces that reduce the complexity of managing computer systems, and that do not require operators to remember a large repertoire of commands and command syntax.

SUMMARY OF THE INVENTION

To overcome the limitations in the prior art described above, and to overcome other limitations that will become apparent upon reading and understanding the present specification, the present invention discloses a method, apparatus, and article of manufacture for generating a graphical user interface from a command syntax for managing multiple computer systems as one computer system. The command syntax is represented using an eXtensible Markup Language (XML) document file, an XML schema file, and a text description file. The XML document file, XML schema file, and text description file are maintained on a server and downloaded to a client as required. A user interface program uses the XML document, XML schema, and text descriptions to generate a "Wizard" that comprises the graphical user interface, wherein the Wizard provides a series of step-by-step dialogs for assisting the operator in creating a command from the command syntax.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention discloses a graphical user interface that can be automatically generated from a command syntax, wherein the graphical user interface is used to manage multiple computer systems as one computer system. The command syntax is represented using an eXtensible Markup Language (XML) document file, an XML schema file, and a text description file. The XML document file, XML schema file, and text description file are maintained on a server and downloaded to a client as required. A user interface program executed by the client uses the XML document, XML schema, and text descriptions to generate a "Wizard" that comprises the graphical user interface, wherein the Wizard provides a series of step-by-step dialogs for assisting the operator in creating a command from the command syntax.

The present invention includes a number of advantages. For example, when the command syntax changes (for example, when a new function is added), updates are only needed at the server, thereby reducing the maintenance cost of clients. In addition, the present invention ensures that all clients are synchronized with the server and have the most up to date version of the command syntax. Moreover, generating the graphical user interface from the command syntax greatly reduces the amount of programming effort involved in creating the user interface. Finally, the command syntax is easier to learn, because the Wizard displays a step-by-step series of dialogs for guiding the operator in the use of the command syntax.

For the present invention, it is important for the server to maintain control of the command syntax in order to support multiple versions thereof. Moreover, the client must not be sensitive to individual versions of the command syntax or it would require an update every time a command was changed. Finally, the tagging rules for the XML allows the user interface program to generate customized Wizards for the command syntax.

Hardware and Software Environment

Figure 1:
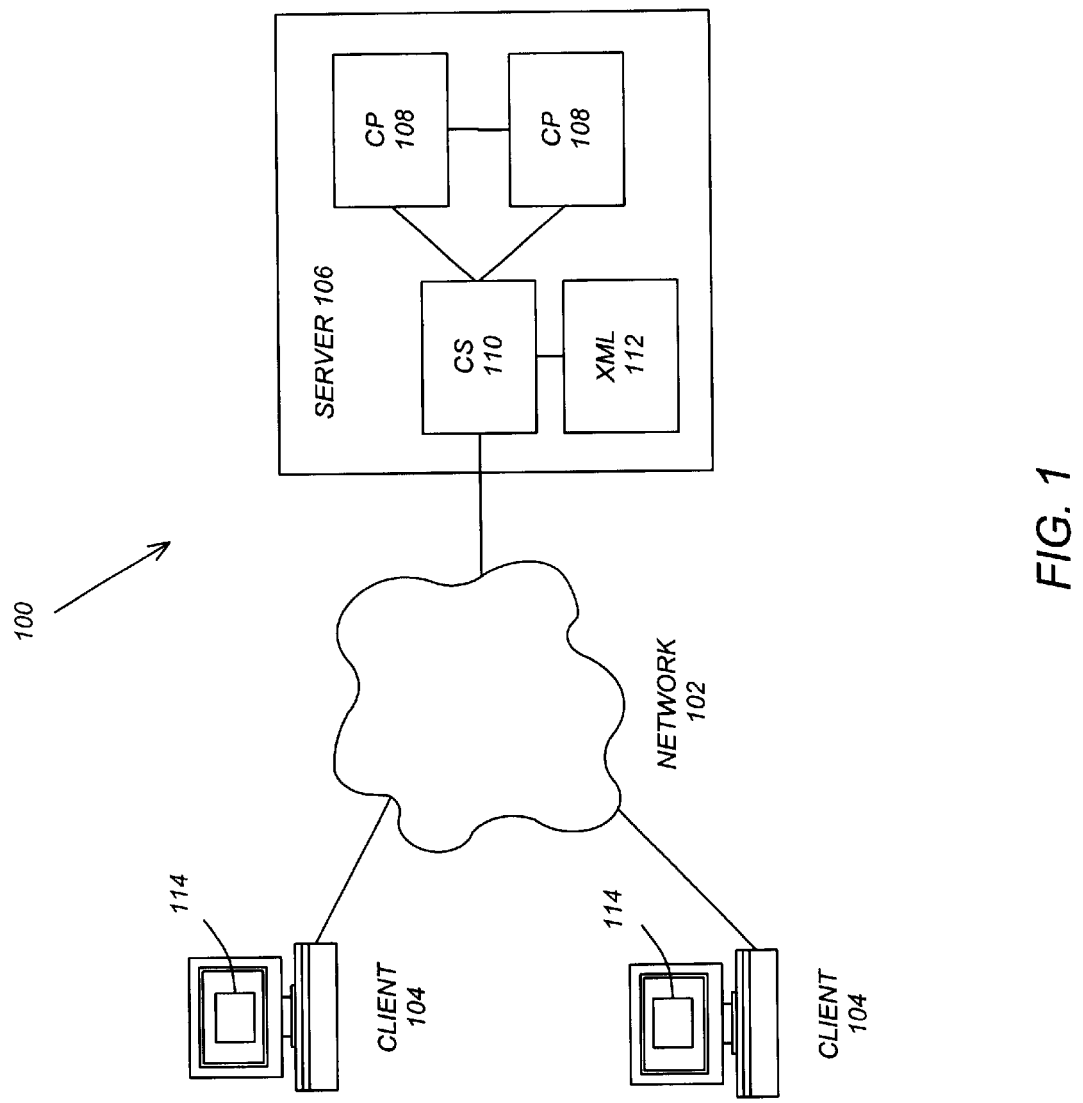
FIG. 1 schematically illustrates the environment of the preferred embodiment of the present invention.

FIG. 1 schematically illustrates the hardware and software environment of the preferred embodiment of the present invention, and more particularly, illustrates a typical distributed computer system 100 using a network 102 to connect one or more clients 104 to a server 106 having one or more data storage devices 108. The network 102 may comprise networks such as LANs, WANs, SNA networks, and the Internet. A typical combination of resources may include clients 104 that are implemented on personal computers or workstations, and servers 106 that are implemented on personal computers, workstations, minicomputers, or mainframes.

The server 106 is a sysplex that executes one or more copies of a Command Processor (CP) 108, which may comprise any number of systems, and any number of different types of systems. The multiple CP's 108 may act individually or as a single system in providing services and applications, but each CP 108 may be managed separately, i.e., a separate command is sent to each CP 108 and each response from a CP 108 is viewed separately. As the number of CP's 108 increases, the manageability of the server 106 becomes more complex.

The server 106 also executes one or more Command Servers (CS) 110 that communicate with all of the CP's 108 and the clients 104 for providing operator control of the CP's 108. The CS 110 maintains a collection of related XML files 112 that represent the command syntax for the CP's 108. The XML files 112 store the command syntax as a separately replaceable unit.

The client 104 executes a user interface program 114 that interacts with the CS 110 to provide an operator with control over the CP's 108. The user interface program 114 receives a copy of the XML files 112 from the CS 110, wherein the XML files 112 represent a command syntax of the highest active release level of the command set for the CP's 108. The user interface program 114 processes the XML files 112 to identify resource types, verbs, and keywords. The user interface program 114 then dynamically displays a "Wizard" comprising a step-by-step series of dialogs that guide the operator through the command syntax, and constructs one or more commands based on the operator selections from the dialogs.

The CS 110 receives the commands from the user interface program 114, and submits the commands to one or more (possibly all) of the CP's 108. The CS 110 then receives responses from the CP's 108 and transmits the responses to the user interface program 114. For example, in response to operator commands, the CS 110 may provide the operator with a list of active CP's 108 executing in the system 100 and/or status notifications from the CP's 108.

Generally, these components 108, 110, 112, and 114 all comprise logic and/or data that is embodied in or retrievable from a computer-readable device, medium, or carrier, e.g., a data storage device, a data communications device, a remote computer or device coupled to the computer via a data communications device, etc. Moreover, this logic and/or data, when read, executed, and/or interpreted by the computer, causes the computer to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database, associated database management system, or peripheral device.

Command Syntax

In the preferred embodiment, the general format of the command syntax for the CP 108 comprises the following:

Verb Resourcetype Keyword (Parameter)

Each of these elements is described below:

VERB—The verb is the first element and identifies the action to be taken. The verb can be abbreviated.

RESOURCETYPE—The resource type is the second element and identifies the type of resource acted upon by the command. The resource may comprise, for example, transactions, databases, terminals, areas, users, etc. The resource type may support a synonym.

KEYWORD—Keywords are optional elements, depending upon the specific command. The keyword may identify resources of one or more CP's 108. The keyword may also identify a function of the command.

PARAMETER—A parameter identifies a defined or created value or resource, such as a database, terminal, area, user, etc. Parameters in commands must be replaced with values. Multiple parameters are separated by a comma within the parentheses.

Of course, those skilled in the art will recognize that other command syntax may be used, as could other elements.

XML Files

In the preferred embodiment, the XML files 112 provide a tag language representation of the command syntax, and generally include an XML document file, an XML schema file, and a text representation file. Examples of these files can be found in the Appendices attached hereto, wherein Appendix I is an exemplary XML document file (CommandSyntax.XML), Appendix II is an exemplary XML schema file (CommandSyntax.DTD), and Appendix III is an exemplary text description file (CommandText.TAG).

XML describes a class of data objects and partially describes the behavior of computer programs that process these objects. XML is a restricted form of SGML (Standard Generalized Markup Language), as defined in ISO 8879. The specification for XML can be found at the URL: http://www.w3.org/TR/REC-xml.

An XML schema specifies constraints on the structures and types of elements in an XML document. The basic schema for XML is the DTD (Document Type Definition), although other XML schema definitions are also being developed, such as DCD (Document Content Definition), XSchema, etc. Information concerning DTD and DCD can be found at the URL: http://www.w3.org/.

A text description file provides the text descriptions that are used by the user interface program to construct the dialogs of the Wizard. The text descriptions are represented by tags that comprise concatenations of the nested XML tag names in the XML document.

The user interface program 114 of the preferred embodiment incorporates an XML processor that is used to read the XML files 112 and provide access to their content and structure. The XML specification located at the URL noted above describes the required behavior of an XML processor in terms of how it must process XML data.

XML Document File

As shown in Appendix I, the XML document file includes an <?xml> version identifier, an <!DOCTYPE root SYSTEM "CommandSyntax.dtd"> identifier of the XML schema file (e.g., .dtd file), and opening and closing <root> and </root> tags. The remaining tags in the XML document file are described below in conjunction with the XML schema file.

The command syntax of the XML document file comprises the command syntax for a database management system (DBMS), and more specifically, the IMS™ DBMS sold by IBM Corporation, the assignee of the present invention.

XML Schema File

Each tag in the XML document file has a set of rules that must be followed, which are defined in the XML schema file. As shown in Appendix II, most of the tags have descriptive names that indicate their function. Following is a description of the tags and their attributes in the preferred embodiment:

- root—Used as a global tag that provides a wrapper for all the other tags. Attributes: none.
- resource—Used to define a resource. Attributes: name—REQUIRED specifies the name of the resource).
- verb—Used to define a verb. Attributes: name—REQUIRED (specifies the name of the verb).
- keyword—Used to define a keyword. Attributes: name—REQUIRED(specifies the name of the keyword); required—OPTIONAL (required parameter for command?); Yes or No. Default is No.
- list—Used within <keyword> to define a list of options. Attributes: name—OPTIONAL (specifies the name of the group); default—OPTIONAL (default value for var); multiple—OPTIONAL (does var accept multiple values? Yes or No. Default is No.); and goto—OPTIONAL (point to another keyword to be enabled).
- compare—Used within <keyword> to define a comparison between an operator and a variable. Attributes: name—REQUIRED (name of comparison).
- option—Used within <list> to make a radio button or checkbox. Attributes: name—REQUIRED (name of keyword this is pointing to); goto—OPTIONAL (point to another keyword to be enabled, wherein the goto attribute of the <list> and <option> tags means that the specified keyword is applicable only when that list or option is selected.)
- var—Used within <keyword> and <list> to define a variable. Attributes: name—REQUIRED (name of variable); wildcard—OPTIONAL (does this var support wildcards? Yes or No. Default is No.); default—OPTIONAL (default value for var.); and multiple—OPTIONAL (does var accept multiple values? Yes or No. Default is No.).
- operator—Used within <compare> to define an operator for the list of operators. Attributes: keyword—REQUIRED (name of keyword this goto points to).

Text Description File

As shown in Appendix III, the tags in the text description file are concatenated versions of tags used in the XML document file. By traversing the XML document file and concatenating the tag names therein, the user interface program 114 can identify the tags used in the text description file and thereby access the text to be displayed by the Wizard. Generally, this text is in HTML (HyperText Markup Language) format, although other formats may be used as well.

The text description file is used for the following reasons:

(1) To provide enhanced output for the operator. In the XML document file, commands are often represented by mnemonics that are recognized by the CP 108, but which may or may not be completely understandable by the operator.

(2) To allow for internationalization or localization of the command syntax. The user interface program 114 may be used in multiple countries, and language support should be provided for each country. Since the XML document and XML schema files cannot be changed (since their format is dictated by the CP 108), the text description file provides a mechanism whereby the Wizard output from the user interface program 114 is understandable by the operator.

(3) To simplify the XML document file. The use of the text description file avoids the inclusion of confusing text descriptions within the XML document file.

Logic of the Preferred Embodiment

Figure 2:
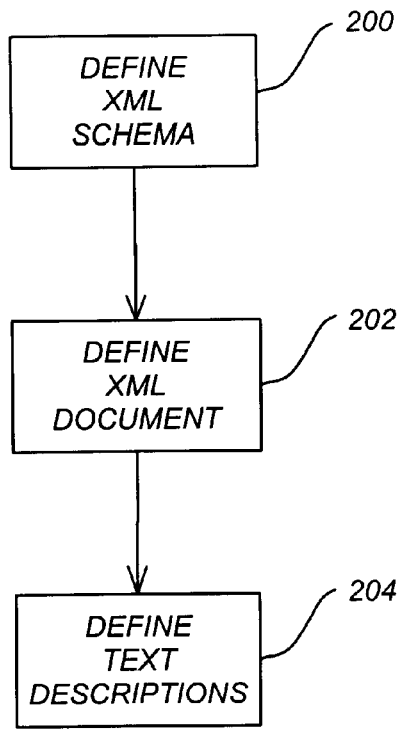
FIG. 2 is a flowchart that illustrates the logic of constructing the eXtensible Markup Language (XML) files according to the preferred embodiment of the present invention.
Figure 3:
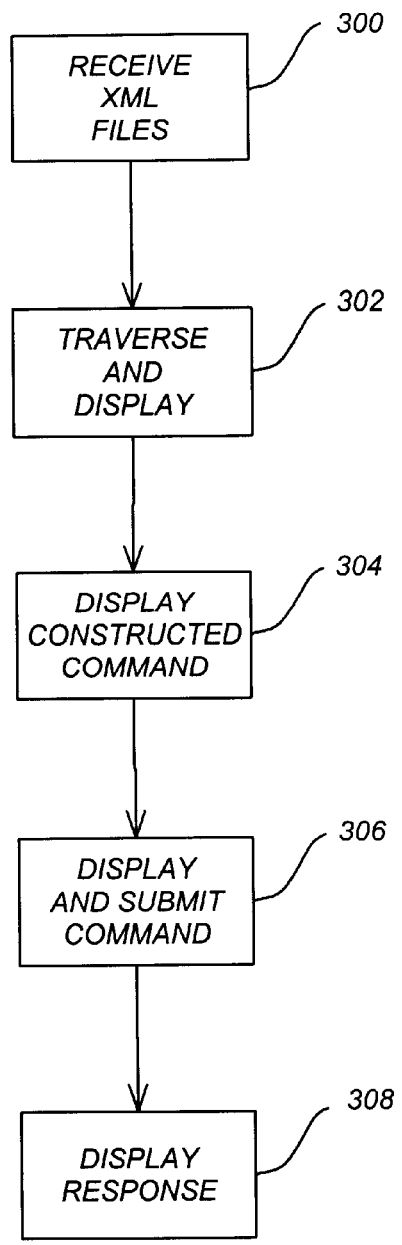
FIG. 3 is a flowchart that illustrates the logic of processing the XML files according to the preferred embodiment of the present invention.

Flowcharts which illustrate the logic according to the preferred embodiment of the present invention are shown in FIGS. 2–3. Those skilled in the art will recognize that this logic is provided for illustrative purposes only and that different logic may be used to accomplish the same results.

FIG. 2 is a flowchart that illustrates the logic of encoding the XML files 112 according to the preferred embodiment of the present invention.

Block 200 represents the XML schema file being defined and then stored on the server 106. Generally, this structure should not change as the command syntax changes.

Block 202 represents the XML document file being defined and then stored on the server 106. The XML document file is defined. Generally, this structure will change as the command syntax changes. The Block includes the following steps:

a. As noted above, the XML document file includes an <?xml> version identifier, an <!DOCTYPE root SYSTEM "CommandSyntax.dtd"> identifier of the XML schema file (e.g., .dtd file), and opening and closing <root> and </root> tags.

b. The resources are defined (TRAN, OLC, . . . ) with <resource> tags. For each resource, its verbs are defined (QUERY, UPDATE, . . . ) with <verb> tags. For each verb, its keywords are defined with <keyword> tags. A keyword can include either a variable (a <var> tag), a list of options (<list> and <option> tags), or a list of operators for comparison (<compare> and <operator> tags).

c. Each command is uniquely identified by a <resource> tag followed by a <verb> tag. Each keyword in the command has its own <keyword> tag, and the type of information a keyword contains can be ascertained by its children. If the keyword contains a <var>, then the operator will prompted to input a variable name.

Block 204 represents the text description file being defined and then stored on the server 106. Generally, this structure will change as the command syntax changes.

FIG. 3 is a flowchart that illustrates the logic of processing the XML files 112 according to the preferred embodiment of the present invention.

Block 300 represents the user interface program 114 receiving the XML files 112 from the server 106.

Block 302 represents the user interface program 114, using the XML schema file as a template, traversing through the tags in the XML document file to gather information from each tag.

Block 304 represents the user interface program 114 constructing a "Wizard" for the XML document file using the text description file, wherein the Wizard displays a series of steps to the operator. Each of the steps displayed by the Wizard corresponds to a <keyword> element in the XML document file. The text description file is used to define the display elements for the Wizard. In the example XML document file provided above, the Wizard would have seven steps as described further below.

Block 306 represents the user interface program 114 displaying the command as it has been built via the operator selections of the Wizard, wherein a button or other mechanism is provided for the operator to submit the command to one or more of the CP's 108.

Block 308 represents the user interface program 114 displaying any responses received from the CP's 108 for the operator.

Graphical User Interface

FIGS. 4A, 4B, 4C, 4D, 4E, 4F, and 4G illustrate the graphical user interface generated from the XML files 112 according to the preferred embodiment of the present invention. These particular "snapshots" of the graphical user interface correspond to the Wizard generated for the example XML files 112 described in the Appendices. Of course, those skilled in the art will recognize that this graphical user interface is provided for illustrative purposes only and that a different graphical user interface may be used to accomplish the same results.

Specifically, the Wizard shown in FIGS. 4A, 4B, 4C, 4D, 4E, 4F, and 4G corresponds to the following portion of Appendix I:

```
<resource name="TRAN">
    <verb name="QUERY">
        <keyword name="NAME" required="YES">
            <var name="TRAN_NAME" wildcard="YES"
                multiple="YES" default="*"/>
        </keyword>
        <keyword name="CLASS">
            <var name="CLASS_NUMBER" multiple="YES"/>
        </keyword>
        <keyword name="STATUS">
            <list>
                <option name="DEFAULT"/>
                <list name="LIST"multiple="YES">
                    <option name="ACT"/>
                    <option name="BAL"/>
                    <option name="INACT"/>
                    <option name="IOPREV"/>
                    <option name="LCK"/>
                    <option name="OLC"/>
                    <option name="PSTO"/>
                    <option name="PUR"/>
                    <option name="QERR"/>
                    <option name="SPND"/>
                    <option name="STO"/>
                    <option name="TRA"/>
                    <option name="USTO"/>
                </list>
            </list>
        </keyword>
        <keyword name="QCNT">
            <compare name="NUMBER">
                <operator name="GT"/>
                <operator name="LT"/>
                <operator name="EQ"/>
                <operator name="GE"/>
                <operator name="LE"/>
                <operator name="NE"/>
            </compare>
```

```
        </keyword>
        <keyword name="SHOW">
            <list>
                <option name="DEFAULT"/>
                <option name="ALL"/>
                <option name="GLOBAL"/>
                <option name="LOCAL"/>
                <list name="LIST" multiple="YES">
                    <option name="CLS"/>
                    <option name="CP"/>
                    <option name="LCT"/>
                    <option name="LP"/>
                    <option name="NP"/>
                    <option name="PARLM"/>
                    <option name="PLCT"/>
                    <option name="PSBNAME"/>
                    <option name="QCNT"/>
                    <option name="RC"/>
                    <option name="SEGNO"/>
                    <option name="SEGSZ"/>
                    <option name="STATUS"/>
                </list>
            </list>
        </keyword>
        <keyword name="ROUTE">
            <var name="IMS" wildcard="YES" multiple="YES"
                default="*"/>
        </keyword>
    </verb>
</resource>
```

In this example, the CP's 108 each comprise a database management system (DBMS), and more specifically, the IMS™ DBMS sold by IBM Corporation, the assignee of the present invention. Thus, as noted above, the command syntax of the XML document file comprises the command syntax for an IMS™ DBMS.

Figure 4A:
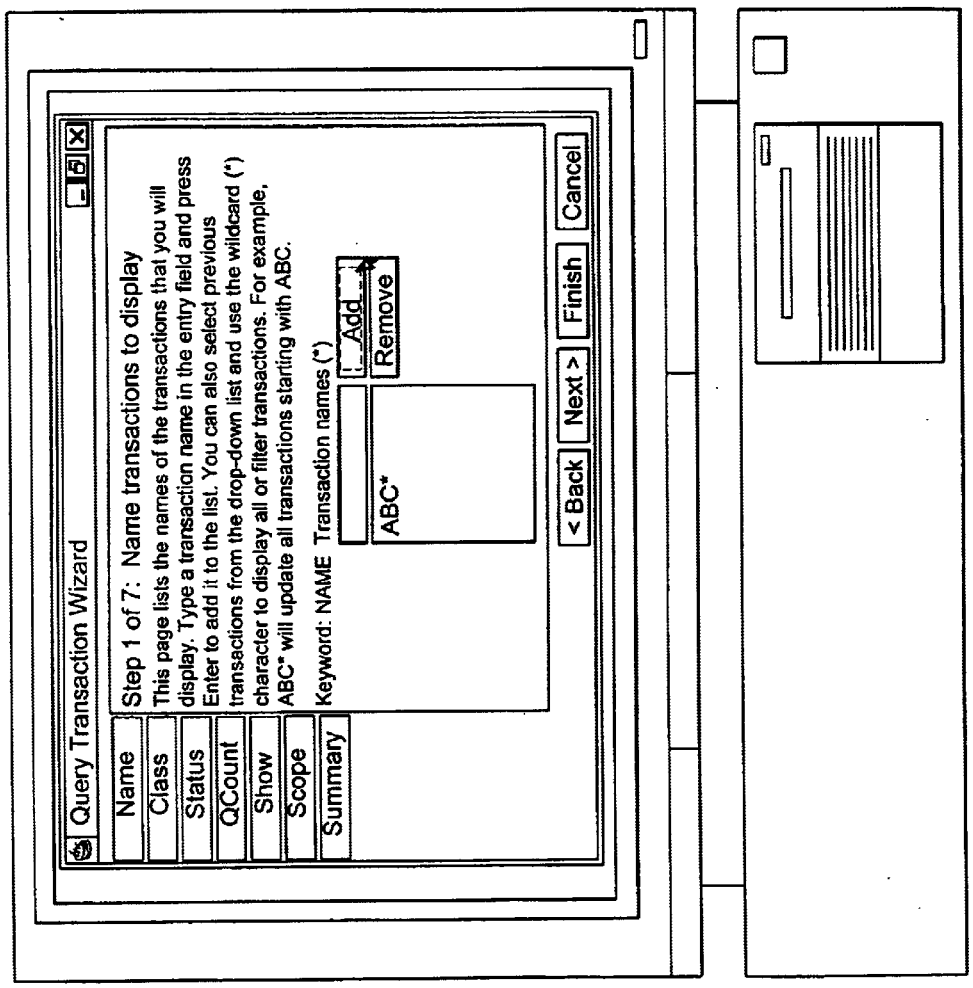
FIGS. 4A, 4B, 4C, 4D, 4E, 4F, and 4G illustrate a graphical user interface generated from the XML files according to the preferred embodiment of the present invention.

FIG. 4A illustrates step 1 of 7 of the Wizard, which prompts the operator to name the transactions to display. This page of the Wizard lists the names of the transactions that will be displayed. The operator types a transaction name in the entry field and presses Enter to add it to the list. The operator can also select previous transactions from the drop-down list and use the wildcard (*) character to display all or filter transactions.

Figure 4B:
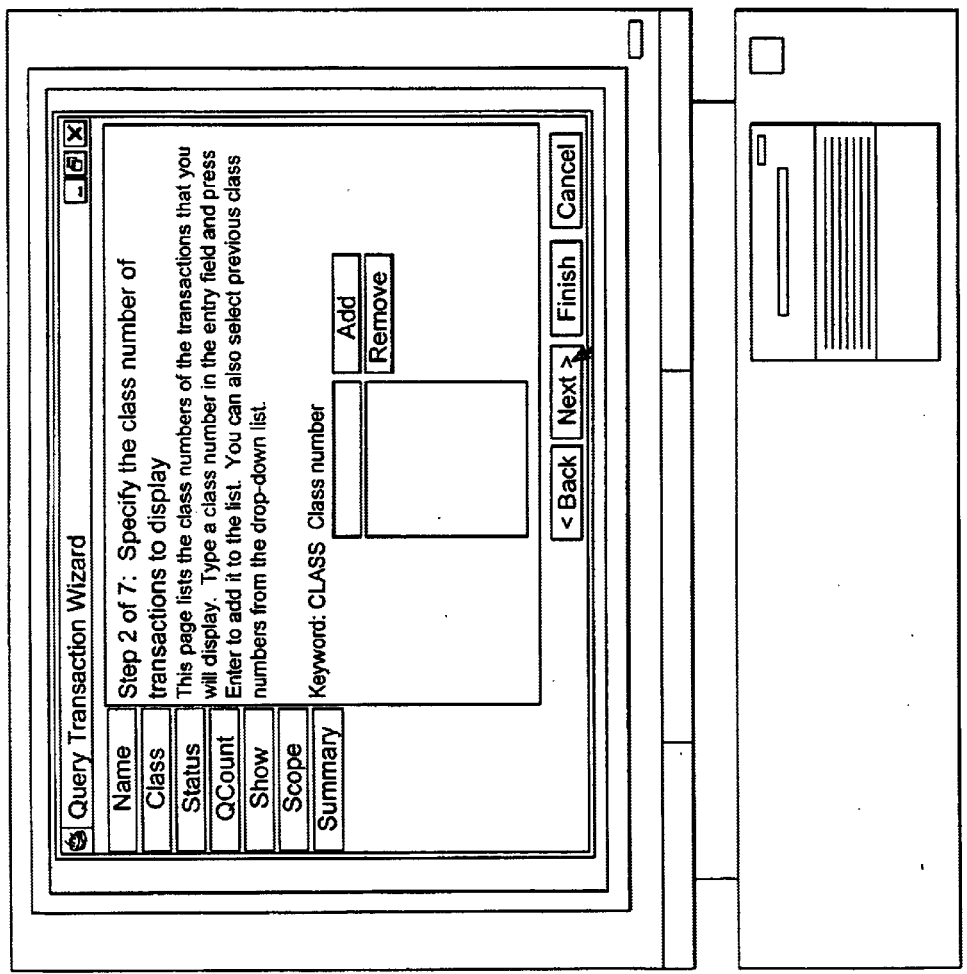

FIG. 4B illustrates step 2 of 7 of the Wizard, which prompts the operator to specify the class number of transactions to display. This page of the Wizard lists the class numbers of the transactions that will be displayed. The operator types a class number in the entry field and presses Enter to add it to the list. The operator can also select previous class numbers from the drop-down list.

Figure 4C:
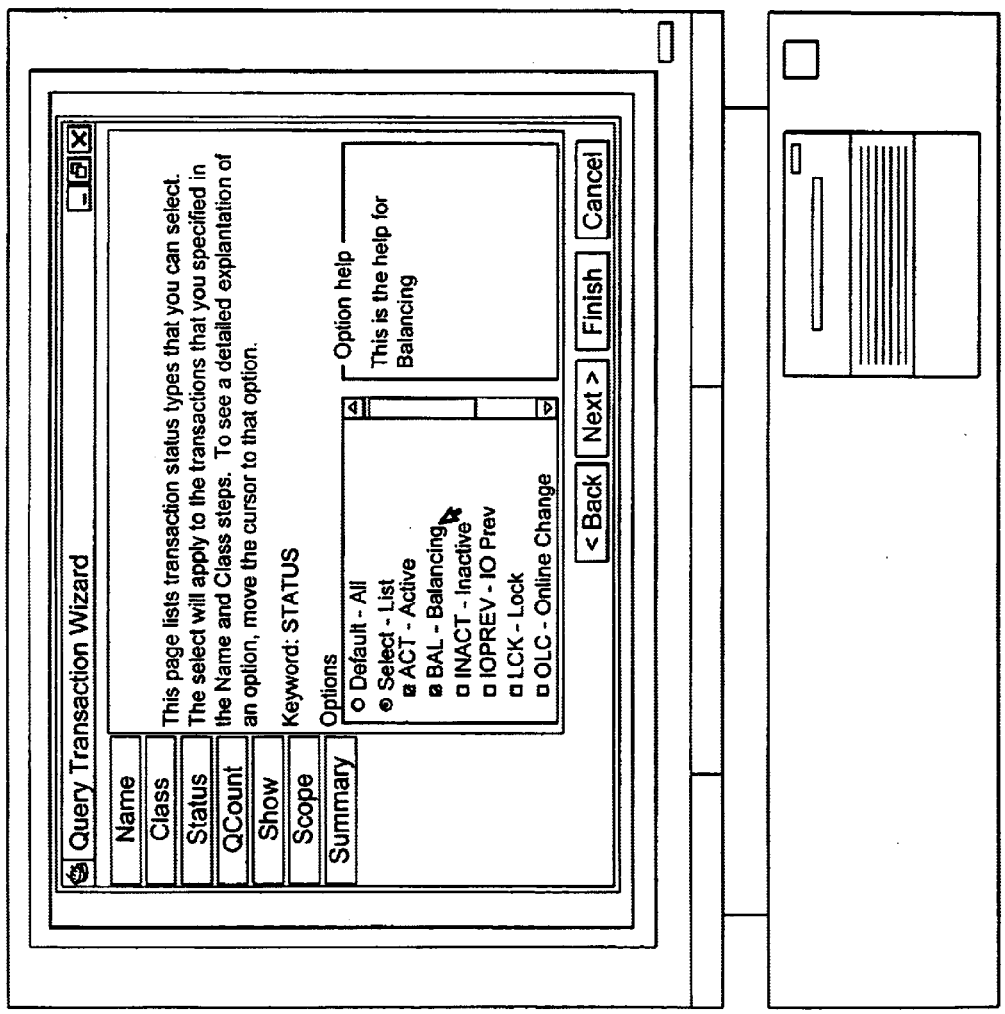

FIG. 4C illustrates step 3 of 7 of the Wizard, which prompts the operator to select a status of the transactions to display. This page of the Wizard lists transaction status types that the operator can select. The select will apply to the transactions that the operator specified in the previous Name and Class steps (i.e., steps 1 and 2).

Figure 4D:
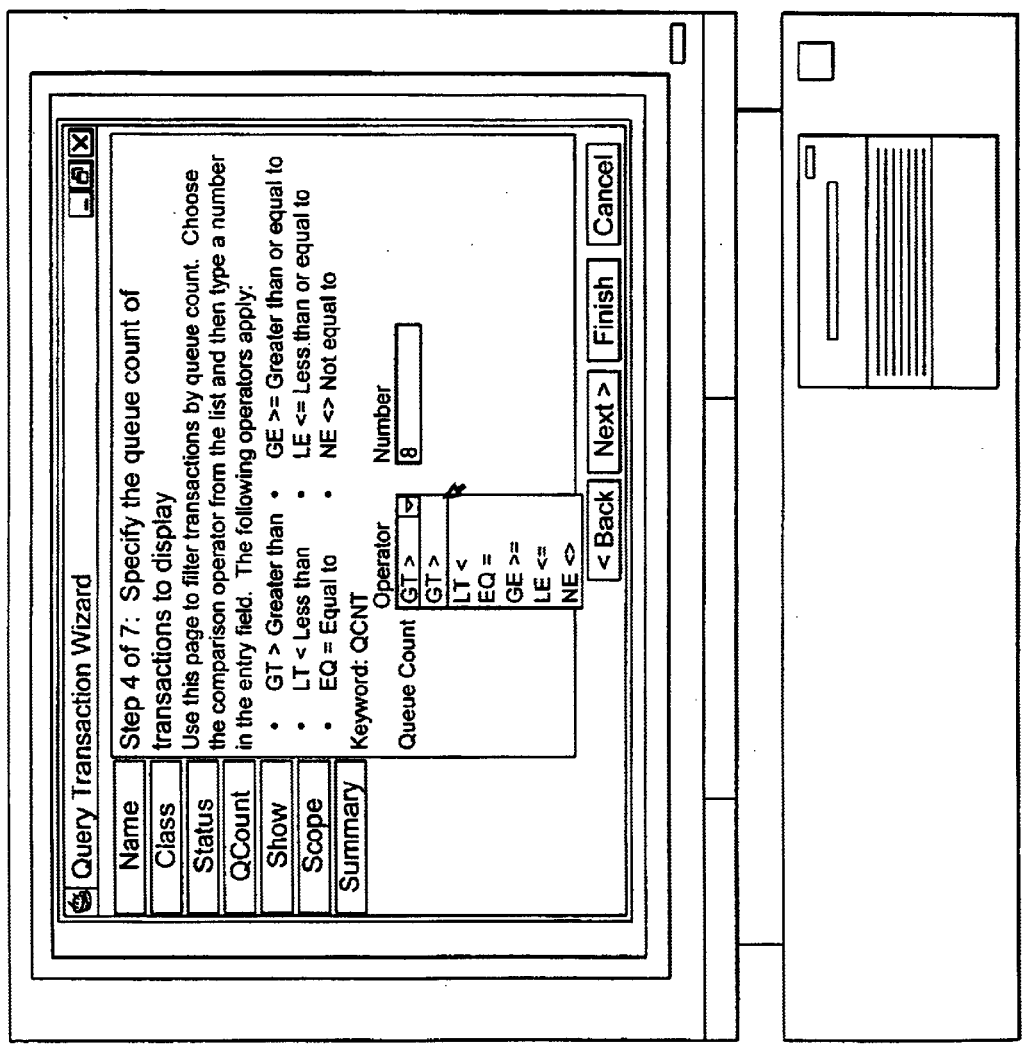

FIG. 4D illustrates step 4 of 7 of the Wizard, which prompts the operator to specify the queue count of transactions to display. This page of the Wizard is used to filter transactions by queue count. The operator chooses the comparison operator from the list and then types a number in the entry field.

Figure 4E:
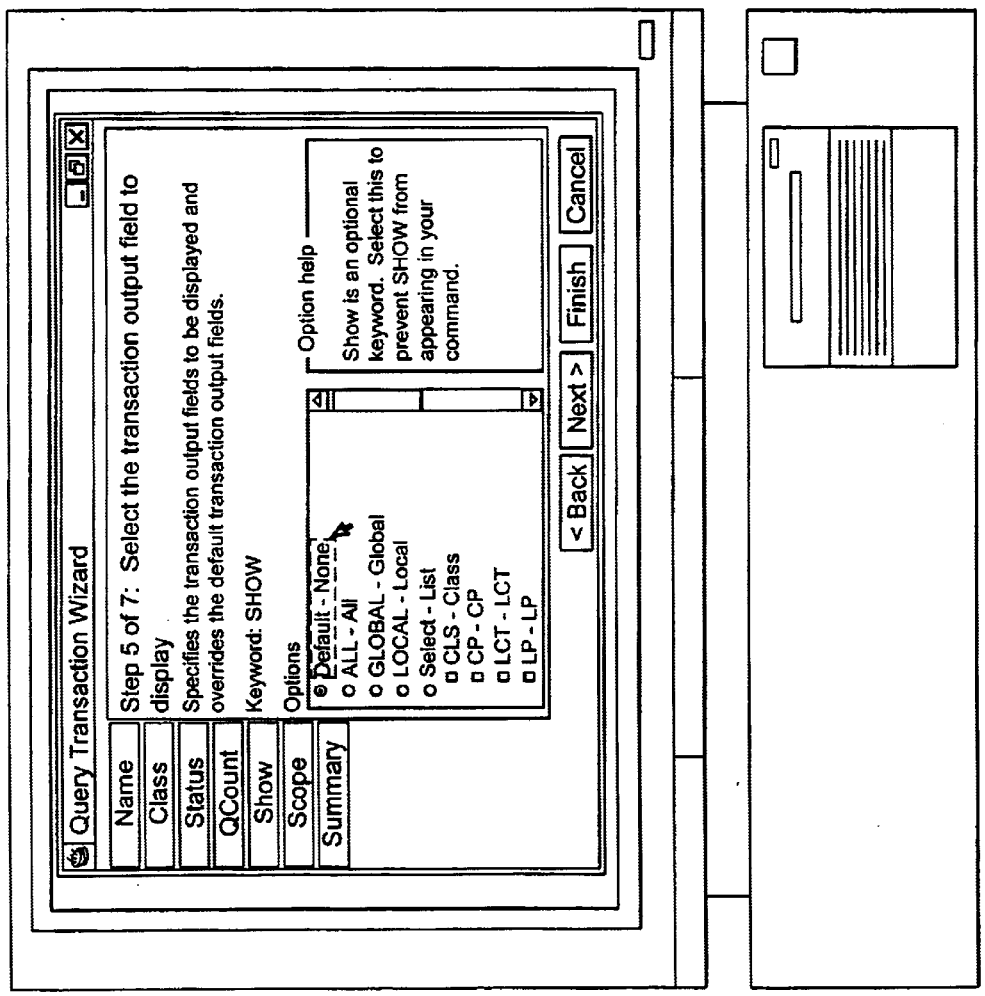

FIG. 4E illustrates step 5 of 7 of the Wizard, which prompts the operator to select the transaction output field to display. This page of the Wizard is used to specify the transaction output fields to be displayed and overrides the default transaction output fields.

Figure 4F:
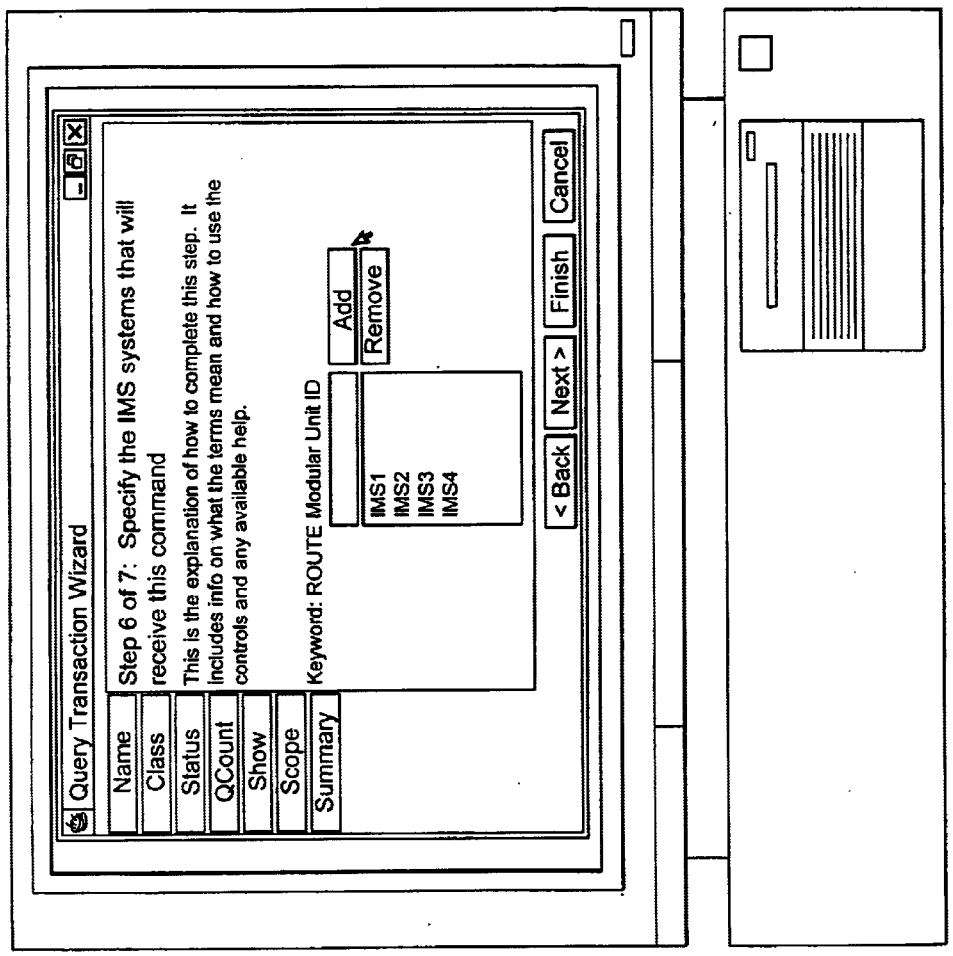

FIG. 4F illustrates step 6 of 7 of the Wizard, which prompts the operator to specify the CP 108 that will receive this command. This page of the Wizard is used to complete the operation and submit the command.

Figure 4G:
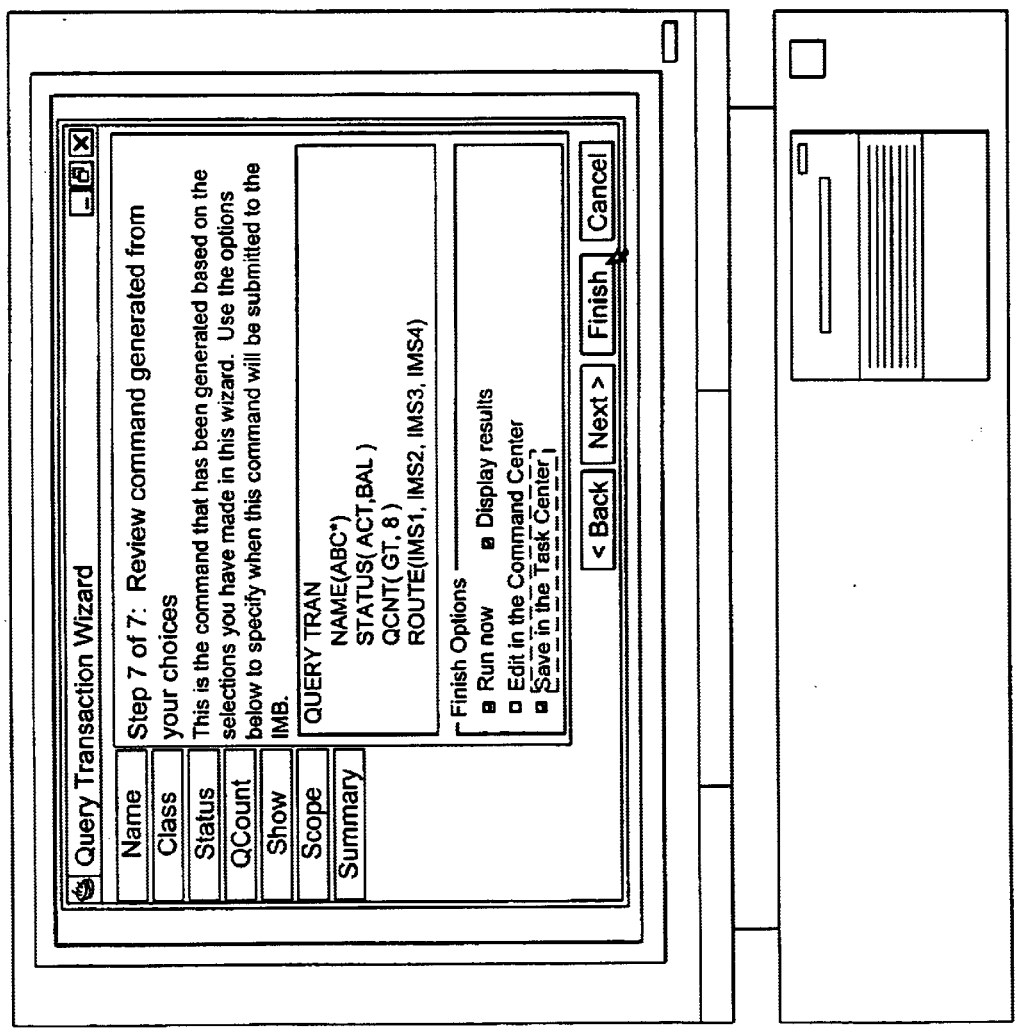

FIG. 4G illustrates step 7 of 7 of the Wizard, which prompts the operator to review the command generated for the specified CP 108. This page of the Wizard is used to specify when the generated command will be submitted to the specified CP 108.

Conclusion

This concludes the description of the preferred embodiment of the invention. In summary, the present invention comprises a method, apparatus, and article of manufacture for generating a graphical user interface from a command syntax for managing multiple computer systems as one computer system. The command syntax is represented using an eXtensible Markup Language (XML) document file, an XML schema file, and a text description file. The XML document file, XML schema file, and text description file are maintained on a server and downloaded to a client as required. A user interface program uses the XML document, XML schema, and text descriptions to generate a "Wizard" that comprises the graphical user interface, wherein the Wizard provides a series of step-by-step dialogs for assisting the operator in creating a command from the command syntax.

The following describes some alternative ways of accomplishing the present invention. Those skilled in the art will recognize that different database management systems, operating environments, etc., could be substituted for those described herein. Those skilled in the art will recognize that the present invention could be used in any type of computer system, and need not be limited to a client-server architecture. Those skilled in the art will recognize that the present invention could be used with many types of computer systems, and need not be limited to the examples described herein. Those skilled in the art will recognize that alternate approaches could be substituted for the approach described herein without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for generating a graphical user interface from a command syntax for managing at least one computer system, comprising:

(a) processing at least one eXtensible Markup Language (XML) file at a user interface program executed by a computer, wherein the XML file represents a command syntax for managing the computer systems; and (b) generating one or more dialogs from the XML file for display to a user, wherein the dialogs are used for assisting the user in creating at least one command in the user interface program for managing the computer systems.

2. The method of claim 1, wherein the XML files are selected from a group comprising an XML document file, XML schema file, and text description file.

3. The method of claim 2, wherein the XML document, XML schema, and text description file are maintained on a separate computer and are downloaded to the computer as required.

4. The method of claim 3, wherein the XML document, XML schema, and text description file are modified on the server as the command syntax changes.

5. The method of claim 2, wherein the XML document, XML schema, and text description file represent a latest version of the command syntax.

6. The method of claim 2, wherein the user interface program processes the XML document using the XML schema to identify resource types, verbs, and keywords therein.

7. The method of claim 2, wherein the text description file provides at least one text description that is used by the user interface program to construct the dialogs.

8. The method of claim 2, wherein the text description file comprises at least one text description that is represented by tags that comprise concatenations of nested XML tag names in the XML document.

9. The method of claim 2, wherein the XML document comprises one or more tags selected from a group comprising:

a root tag that is a global tag that provides a wrapper for all other tags, a resource tag that is used to define a resource, a verb tag that is used to define a verb, a keyword tag that is used to define a keyword, a list tag that is used within the keyword tag to define a list of options, a compare tag that is used within the keyword tag to define a comparison between an operator and a variable, an option tag that is used within the list tag to define optional selections for a keyword, a variable tag that is used within the keyword and list tags to define a variable, and an operator tag that is used within the compare tag to define an operator for a list of operators.

10. The method of claim 1, wherein the dialogs comprise a Wizard for use by the user in generating commands for the computer system.

11. The method of claim 10, wherein the Wizard displays a step-by-step series of dialogs for guiding the user in the use of the command syntax, so that the command syntax is easier to learn.

12. The method of claim 1, wherein the commands are submitted to multiple computer systems.

13. The method of claim 1, wherein the user interface program is not sensitive to a format for the command syntax that are used to manage the computer systems.

14. A computer-implemented system for generating a graphical user interface from a command syntax for managing at least one computer system, comprising:

(a) a computer; and (b) a user interface program, executed by the computer, for processing at least one eXtensible Markup Language (XML) file at a user interface program executed by a computer, wherein the XML represents a command syntax for managing the computer systems, and for generating one or more dialogs from the XML file for display to a user, wherein the dialogs are used for assisting the user in creating at least one command in the user interface program for managing the computer systems.

15. The system of claim 14, wherein the XML files are selected from a group comprising an XML document file, XML schema file, and text description file.

16. The system of claim 15, wherein the XML document, XML schema, and text description file are maintained on a separate computer and are downloaded to the computer as required.

17. The system of claim 16, wherein the XML document, XML schema, and text description file are modified on the sewer as the command syntax changes.

18. The system of claim 15, wherein the XML document, XML schema, and text description file represent a latest version of the command syntax.

19. The system of claim 15, wherein the user interface program processes the XML document using the XML schema to identify resource types, verbs, and keywords therein.

20. The system of claim 15, wherein the text description file provides at least one text description that is used by the user interface program to construct the dialogs.

21. The system of claim 15, wherein the text description file comprises at least one text description that is represented by tags that comprise concatenations of nested XML tag names in the XML document.

22. The system of claim 15, wherein the XML document comprises one or more tags selected from a group comprising:
- a root tag that is a global tag that provides a wrapper for all other tags,
- a resource tag that is used to define a resource,
- a verb tag that is used to define a verb,
- a keyword tag that is used to define a keyword,
- a list tag that is used within the keyword tag to define a list of options,
- a compare tag that is used within the keyword tag to define a comparison between an operator and a variable,
- an option tag that is used within the list tag to define optional selections for a keyword,
- a variable tag that is used within the keyword and list tags to define a variable, and an operator tag that is used within the compare tag to define an operator for a list of operators.

23. The system of claim 14, wherein the dialogs comprise a Wizard for use by the user in generating commands for the computer system.

24. The system of claim 23, wherein the Wizard displays a step-by-step series of dialogs for guiding the user in the use of the command syntax, so that the command syntax is easier to learn.

25. The system of claim 14, wherein the commands are submitted to multiple computer systems.

26. The system of claim 14, wherein the user interface program is not sensitive to a format for the command syntax that are used to manage the computer systems.

27. An article of manufacture embodying logic for performing a method for generating a graphical user interface from a command syntax for managing at least one computer system, comprising:
(a) processing at least one eXtensible Markup Language (XML) file at a user interface program executed by a computer, wherein the XML file represents a command syntax for managing the computer systems; and
(b) generating one or more dialogs from the XML file for display to a user, wherein the dialogs are used for assisting the user in creating at least one command in the user interface program for managing the computer systems.

28. The method of claim 27, wherein the XML files are selected from a group comprising an XML document file, XML schema file, and text description file.

29. The method of claim 28, wherein the XML document, XML schema, and text description file are maintained on a separate computer and are downloaded to the computer as required.

30. The method of claim 29, wherein the XML document, XML schema, and text description file are modified on the server as the command syntax changes.

31. The method of claim 28, wherein the XML document, XML schema, and text description file represent a latest version of the command syntax.

32. The method of claim 28, wherein the user interface program processes the XML document using the XML schema to identify resource types, verbs, and keywords therein.

33. The method of claim 28, wherein the text description file provides at least one text description that is used by the user interface program to construct the dialogs.

34. The method of claim 28, wherein the text description file comprises at least one text description that is represented by tags that comprise concatenations of nested XML tag names in the XML document.

35. The method of claim 28, wherein the XML document comprises one or more tags selected from a group comprising:
- a root tag that is a global tag that provides a wrapper for all other tags,
- a resource tag that is used to define a resource,
- a verb tag that is used to define a verb,
- a keyword tag that is used to define a keyword,
- a list tag that is used within the keyword tag to define a list of options,
- a compare tag that is used within the keyword tag to define a comparison between an operator and a variable,
- an option tag that is used within the list tag to define optional selections for a keyword,
- a variable tag that is used within the keyword and list tags to define a variable, and
- an operator tag that is used within the compare tag to define an operator for a list of operators.

36. The method of claim 27, wherein the dialogs comprise a Wizard for use by the user in generating commands for the computer system.

37. The method of claim 36, wherein the Wizard displays a step-by-step series of dialogs for guiding the user in the use of the command syntax, so that the command syntax is easier to learn.

38. The method of claim 27, wherein the commands are submitted to multiple computer systems.

39. The method of claim 27, wherein the user interface program is not sensitive to a format for the command syntax that are used to manage the computer systems.

* * * * *